(12) United States Patent
Fukumoto et al.

(10) Patent No.: US 6,775,706 B1
(45) Date of Patent: Aug. 10, 2004

(54) MULTI-PROTOCOL SWITCHING SYSTEM, LINE INTERFACE AND MULTI-PROTOCOL PROCESSING DEVICE

(75) Inventors: Keisuke Fukumoto, Tokyo (JP); Tsugio Okamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 634 days.

(21) Appl. No.: 09/594,720

(22) Filed: Jun. 16, 2000

(30) Foreign Application Priority Data

Jun. 18, 1999 (JP) ............................................ 11-172462

(51) Int. Cl.[7] .............................................. G06F 15/16
(52) U.S. Cl. ..................................... 709/230; 370/389
(58) Field of Search ................................ 709/201–253; 370/389

(56) References Cited

U.S. PATENT DOCUMENTS

| | | | | |
|---|---|---|---|---|
| 5,425,026 A | * | 6/1995 | Mori | 370/410 |
| 6,252,878 B1 | * | 6/2001 | Locklear et al. | 370/401 |
| 6,272,132 B1 | * | 8/2001 | Ofek et al. | 370/389 |
| 6,337,861 B1 | * | 1/2002 | Rosen | 370/389 |
| 6,339,595 B1 | * | 1/2002 | Rekhter et al. | 370/392 |
| 6,430,155 B1 | * | 8/2002 | Davie et al. | 370/232 |
| 6,512,768 B1 | * | 1/2003 | Thomas | 370/389 |
| 6,633,563 B1 | * | 10/2003 | Lin et al. | 370/389 |

FOREIGN PATENT DOCUMENTS

| | | |
|---|---|---|
| JP | 60-140957 A | 7/1985 |
| JP | 61-127252 A | 6/1986 |
| JP | 3-283849 A | 12/1991 |
| JP | 4-179327 A | 6/1992 |
| JP | 7-321808 A | 12/1995 |
| JP | 9-83562 A | 3/1997 |

* cited by examiner

*Primary Examiner*—David Wiley
*Assistant Examiner*—Scott M. Collins
(74) *Attorney, Agent, or Firm*—Foley & Lardner LLP

(57) ABSTRACT

A multi-protocol switching system of the invention has a plurality of line interfaces that has an input section for inputting data from a network, a forwarding table, a determination section for determining a destination or the input data, a packet generating section for generating a packet, when the destination determined is a protocol processor, by adding a processor identifier of the protocol processor and a port number to which the multi-protocol processing device is connected to the input data, and an output section for outputting the packet through the port to a switch. Also it has one or more multi-protocol processing devices that has a switch interface, a plurality of protocol processors which are provided corresponding to the kind of protocol and each of which has a processor identifier defined in the multi-protocol processing device, and a processor selecting section.

9 Claims, 4 Drawing Sheets

| VCI | PORT NUMBER | VPI |
|---|---|---|
| 11 | 1 | 4 |
| 20 | 5 | 7 |
| 13 | 3 | 14 |
| ⋮ | ⋮ | ⋮ |

MULTI-PROTOCOL SWITCHING SYSTEM, LINE INTERFACE AND MULTI-PROTOCOL PROCESSING DEVICE

FIELD OF THE INVENTION

This invention relates to a multi-protocol switching system that contains various types of interfaces, such as ATM (asynchronous transfer mode) and Ethernet, and processes the higher protocol, an line interface that is provided for the system and serves as an interface to line, and a multi-protocol processing device that is included in the trunk section of the system.

BACKGROUND OF THE INVENTION

In conventional multi-protocol switching systems, it has been necessary to mount multiple kinds of protocol processing devices for processing the respective protocols of line interfaces at the trunk section of the system according to the kinds of line interface.

In general, in multi-protocol switching system, the traffic of data transfer between line interfaces is more than the traffic to or from the protocol processing device. Namely, the usage rate of a bus between protocol processing device and switch is lower than the usage rate between line interface and switch. Therefore, when multiple protocol processing devices are mounted on a multi-protocol switching system, there must exist ports with a low usage rate connected to multiple protocol processing devices. Thus, the resource of switch cannot be used efficiently.

Also, in multi-protocol switching system, besides the function to repeat data from line interface to line interface, the routing destination determination function to determine a destination line interface is required. Also, required is a function that a central processing device manages the congestion state of multi-protocol switching system or the processing state of centralized processing section, informing these states of each line interface, thereby changing dynamically into a centralized processing section assigned to repeating. These three functions cannot be realized by only information of line interface to input data. To realize these functions, the centralized processing using information from all line interfaces is required Meanwhile, the line interface includes various types of line interfaces, such as a line interface for connection-oriented communication like ATM and a line interface for connectionless communication like IP (Internet protocol). Taking the case of the above routing processing, in conducting the centralized processing both the routing processing or connection-oriented communication and the routing processing of connectionless communication, the processing load becomes heavy. Also, when trying to increase the kind of line interface, it is expected that part to conduct the centralized processing mentioned above is subject to a heavy load and thereby it is difficult to add the kind or number of line interface.

Furthermore, in transferring data from line interface to centralized operation section, when the line interface and centralized operation section are connected through a conventional bus, the transfer capability to the increase of line interface becomes insufficient.

SUMMARY OF THE INVENTION

Accordingly, it is an object of the invention to provide a multi-protocol switching system that offers a high usage rate of port to which a protocol processing device is connected.

According to the invention, a multi-protocol switching system, comprises:

a plurality of line interfaces that comprise an input section for inputting data from a network, a forwarding table, a determination section for determining a destination of the input data based on the content of a header of the input data and the content of the forwarding table, a packet generating section for generating a packet, when the destination determined by the determination section is a protocol processor, by adding a processor identifier of the protocol processor as the destination in a multi-protocol processing device and a port number to which the multi-protocol processing device equipped with the protocol processor is connected to the input data, or when the destination determined by the determination section is a line interface, by adding a port number to which the line interface as the destination is connected to the input data, and an output section for outputting the packet through the port to a switch:

the switch for forwarding the packet to the port having the port number included in the packet; and the one or more multi-protocol processing devices that comprise a switch interface for inputting/outputting the packet to/from the switch through the port, a plurality of protocol processors which are provided corresponding to the kind of protocol and each of which has a processor identifier defined in the multi-protocol processing device, and a processor selecting section for outputting the packet input through the switch interface to the protocol processor having the processor identifier included in the packet;

wherein a protocol handled by one or the plurality of line interfaces is different from a protocol handled by another of the plurality of line interfaces.

According to another aspect of the invention, a line interface, comprises:

an input section for inputting data from a network;

a forwarding table:

a determination section for determining a destination of the input data based on the content of a header of the input data and the content of the forwarding table;

a packet generating section for generating a packet, when the destination determined by the determination section is a protocol processor, by adding a processor identifier of the protocol processor as the destination in a multi-protocol processing device and a port number to which the multi-protocol processing device equipped with the protocol processor is connected to the input data, or when the destination determined by the determination section is a line interface, by adding a port number to which the line interface as the destination is connected to the input data; and an output section for outputting the packet through the port to a switch.

According to another aspect of the invention, a multi-protocol processing device, comprises:

a switch interface for inputting/outputting a packet to/from a switch through a port;

a plurality of protocol processors which are, provided corresponding to the kind of protocol and each of which has a processor identifier defined in the multi-protocol processing device; and a processor selecting section for outputting the packet input through the switch interface to a protocol processor having the processor identifier included in the packet.

In this invention, the multi-protocol switching system for containing various types of interfaces, such as ATM (asynchronous transfer mode) and Ethernet, and processing the higher protocol is characterized in that it is provided with a multi-protocol processing device to handle multiple kinds of protocols at the trunk section of switch so an to maximize the usage rate of the switch, and that the multi-protocol processing device has a function for performing the distributed processing to each protocol. Also, the multi-protocol switching system of the invention is characterized in conducting the distribution of processing to each protocol by self-routing.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
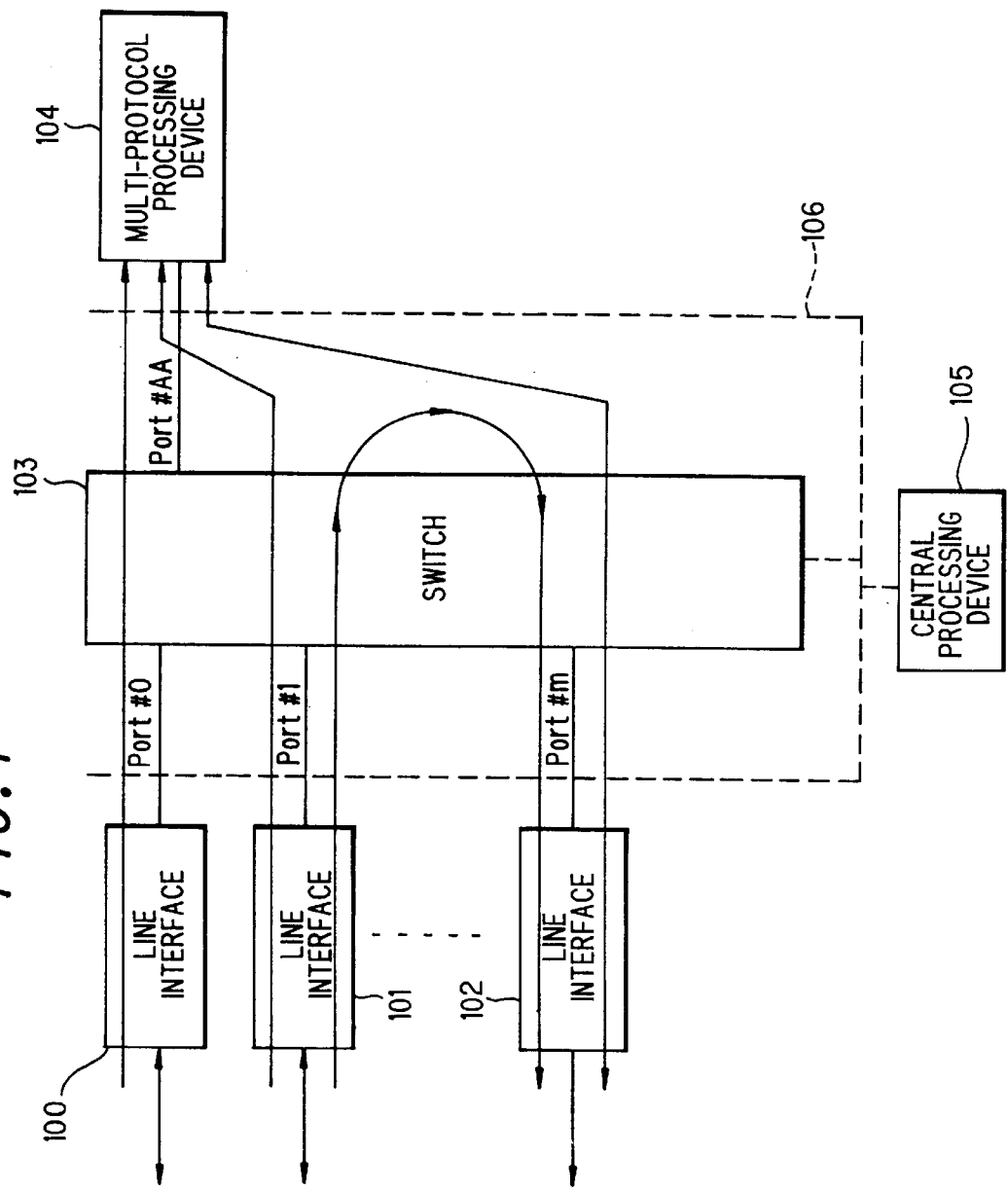
FIG. 1 is a block diagram showing the composition of a multi-protocol switching system in a preferred embodiment according to the invention.

The preferred embodiments of the invention will be explained below, referring to the drawings.

Figure 2:
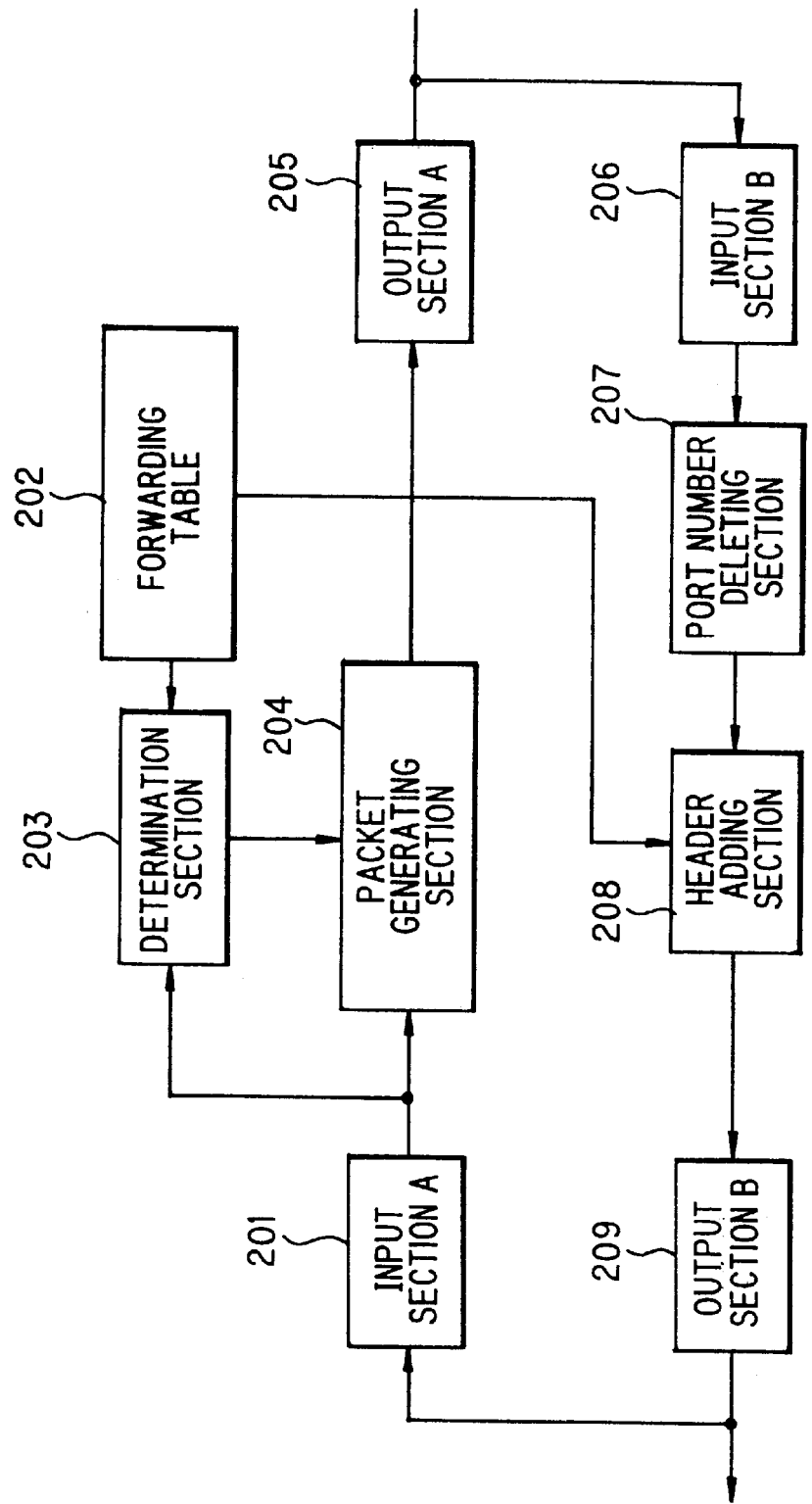
FIG. 2 is a block diagram showing the composition of a line interface in FIG.1.

In FIG. 2, an input section A of a line interface 100, 101 or 102 receives data to be repeated in a multi-protocol switching system from a network. A determination section 203 determines a port number to which a destination of data is connected, based on contents being searched from a forwarding table 202 in the line interface and header information of the data. A packet generating section 204, when the destination of the data is a multi-protocol processing device 104, adds a port number to which the multi-protocol processing device 104 is connected, and an identifier (hereinafter referred to as processor IC) of a protocol processor to process the data in the multi-protocol processing device 104, to the data. Also, the packet generating section 204, when a destination of data is a line interface, adds the number of a port to which the line interface is connected, to the data. An output section A 205 outputs a packet generated by the packet generating section 204 to a switch 103.

In FIG. 1, the switch 103 transfers data input from the line interface 100, 102 or 102 to a port designated by a port number determined.

In FIG. 2, an input section B of the line interface 100, 101 or 102 receives a packet through the port from the switch 103. A port number deleting section 207 deletes the port number from the packet. A header adding section 208 obtains the address of the data link layer of a terminal to which the data is forwarded next from the forwarding table 202, and reconstructs a header of the data link layer including that address. An output section B 209 outputs data having the reconstructed header to the network.

In this invention, the multi-protocol processing device 104 as a centralized operation section is provided in the trunk section of the switch, and the line interface and multi-protocol processing device are connected using the switch, not a bus. By this composition, the problem of the conventional bus transfer capability can be solved.

Also, in the multi-protocol processing device 104, protocol processors for processing protocols such as ATM and IP are provided for the respective protocols. Thereby, the distributed processing for each protocol is performed, and the problem on concentration of processing can be thus solved.

Further, by connecting the switch 103 with any one of the multiple protocol processors by self-routing, the assignment of data in unit of protocol processing is sped up and the performance of processing is enhanced. An example thereof is explained below.

When the line interface 100 detects that the reception of data needs to be processed by the routing protocol using the header information of the receive data, the receive data is transferred through the switch 103 to the multi-protocol processing device 104. In this case, the line interface adds a port number of the switch to which the multi-protocol processing device 104 is connected and a processor ID to conduct the protocol processing needed for the receive data, to the receive data, and outputs it to the switch 103.

Figures 3, 4:
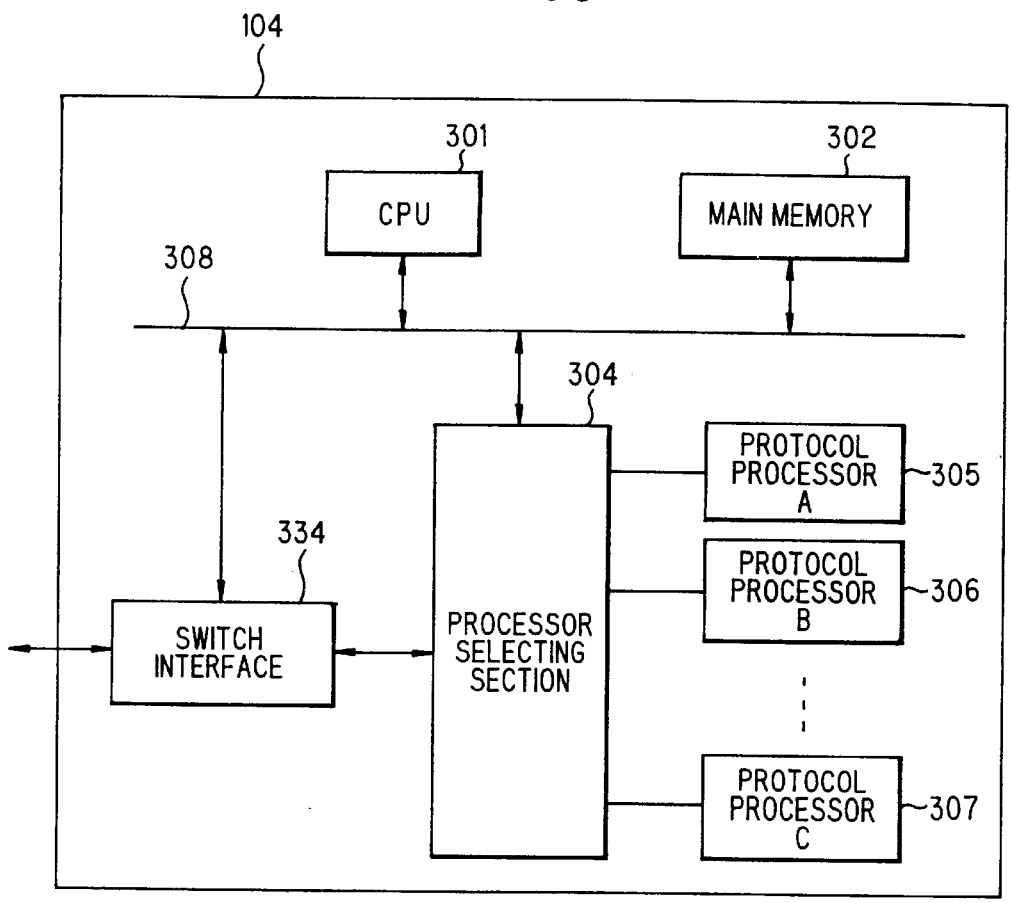
FIG. 3 is a block diagram showing the composition of a multi-protocol processing device in FIG. 1.
FIG. 4 is an explanatory diagram showing an example of forwarding table used in the preferred embodiment of the invention.

Then, in FIG. 3, a switch interface 334 of the multi-protocol processing device 104 receives the packet through a port from the switch 103, deleting the port number from the packet, forwarding the data to a processor selecting section 304. The processor selecting section 304 judges a protocol processor to which the data is forwarded from its processor ID, deleting the processor ID from the packet, forwarding the data to the protocol processor. When anyone of protocol processors 305 to 307 receives the data sent by self-routing based on the port number and processor ID, it conducts the protocol processing assigned to itself in advance. For example, the protocol processing includes a signaling in case of ATM cell, and a routing calculation in case of IP packet.

FIG. 1 is a block diagram showing the composition of the multi-protocol switching system in the preferred embodiment according to the invention. In FIG. 1, 100 to 102 are the line interfaces, 103 is the switch, 104 is the multi-protocol processing device, 105 is an central processing device, and 106 is a maintenance bus through which the central processing device 105 conducts the initial setting and state monitoring of the line interfaces 100 to 102 and if the multi-protocol processing device 104. The switch 103 and the line interfaces 100 to 102 are connected through the ports. Also, the switch 103 and the multi-protocol processing device 104 are connected through the ports.

The multi-protocol processing device 104 is included in the trunk section of the switch. The central processing device 105 conducts the control such as device management etc. In a normal case, the central processing device 105 is composed of a processor, main memory and secondary storage, and it operates according to a program stored in the main memory.

The line interfaces 100 to 102 each are a line interface card that has an interface such as ATM, Ethernet, T1/E1 etc. For example, a line interface card with an Ethernet interface determines the port number of a destination switch from the IP address, adding the switch port number as an internal header to an etherframe and outputting it to the switch 103. Also, the line interfaces 100 to 102 receives data from the switch 103, deleting the port number, searching the forwarding table by keying an IP address, obtaining a MAC address of a terminal to which data is transferred next, reconstructing the header of etherframe and outputting the data to the network. The switch 103 transfers the data by switching according to the switch port number. The multi-protocol processing device 104 for the processing of routing function etc. conducts the processing of data input through the switch 103 from the different kinds of line interfaces 101 to 102, according to each protocol. For example, for the ATM cell signaling processing is performed. Also, for an IP packet, the routing calculation is performed, receiving the routing protocol packet, updating the routing table and distributing the forwarding table to a line interface having the interface required to transfer data on the IP layer.

Although in FIG. 1 the number of multi-protocol processing device is one, a plurality of the multi-protocol processing devices may be mounted.

FIG. 3 is a block diagram showing the detailed composition of the multi-protocol processing device 104.

In FIG. 3, the multi-protocol processing device 104 comprises the switch interface 334 to the switch 103, the processor selecting section 304, the protocol processors 305 to 307 that process data input through the switch 103 from the respective line interfaces 100 to 102, a main memory 302, and a CPU 301 that conducts the management of the entire multi-protocol processing device 104. The switch interface 334 outputs receive packets in the order of data reception to the processor selecting section 304. The processor selecting section 304 judges to which protocol processor data in the packet received from the switch interface 303 should be forwarded, based on the processor ID. The number of kinds of the protocol processors 305 to 307 corresponds to the number of kinds of the line interfaces. The protocol processors 305 to 307 each correspond to a protocol processor for ATM, a protocol processor for IP packet and the like.

The operation of this embodiment is explained below, referring to FIG. 1.

In FIG. 1, the explanation is made taking the case that the line interface 100, 101 or 102 is a line interface having an ATM interface. The line interface 100, 101 or 102 receives an ATM cell, determines a destination port number from a VCI (virtual channel identifier) of the ATM header, adds the port number as an internal header to the ATM cell and outputs it to the switch 103. Here, the destination is the line interface 100, 101 or 102 or the multi-protocol processing device 104. Also, when the line interface 100, 101 or 102 receives data from the switch 103, it deletes the port number, assigning a VPI (virtual path identifier) corresponding to the VCI of the ATM header and outputs the ATM cell to the network.

Figure 5:
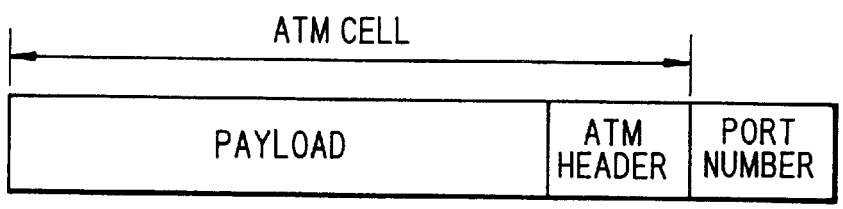
FIG. 5 is an explanatory diagram showing a packet format based on ATM cell output from line interface in prior art.

In the above processing, when the ATM network is a PVC (permanent virtual connection), the correspondence between VCI and the destination port number and the correspondence between VCI and VPI are made searching a forwarding table supplied from the multi-protocol processing device 104. FIG. 4 shows an example of the forwarding table. Also, FIG. 5 shows a format to be output to the switch 103. As shown in FIG. 5, the format is of an ATM cell with a destination port number added.

When the ATM network is a SVC (switched virtual connection), the signaling processing is conducted installing UNI (user-network interface) signaling and P-NNI (private network node interface) signaling into the multi-protocol processing device 104, thereby the setup or release processing of a call is performed.

Figure 6:
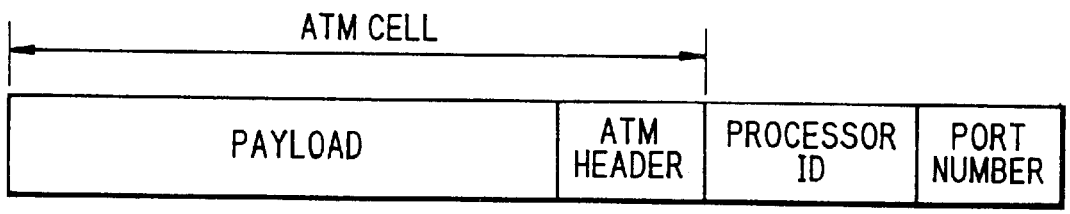
FIG. 6 is an explanatory diagram showing a packet format based on ATM cell output from the line interface in the preferred embodiment of the invention.

In FIG. 1, the operation in the case of the destination port number is a port number where the multi-protocol processing device is mounted is explained. For the ATM cell composing data to require the signaling processing, the line interface 100, 101 or 102 adds the destination port number to indicate the multi-protocol processing device 104 and a processor ID to the ATM cell, outputting it to the switch 103. The format hereupon is shown in FIG. 6. The port number is information for allowing the switch 103 to switch, and in this case is the port number where the multi-protocol processing device 104 is mounted. In FIG. 1, port number #AA is designated. The processor ID is a logical ID to indicate a protocol processor that is mounted on the multi-protocol processing device 104 and conducts the processing according to each protocol. The multi-protocol processing device 104 sends the data by the self-routing to the protocol processor 305, 306 or 307 by referring to the processor ID.

The method of obtaining a processor ID, in the line interface 100, 101 or 102, that belongs to any one of the protocol processors of the multi-protocol processing device and is according to each protocol is explained next. When initial values of the system are set up or when a line interface is added, the multi-protocol processing device 104 receives information about which protocol a line interface connected to each port handles, through the maintenance bus 106 from the central processing device 105, and then informs the central processing device 105 of the processor ID of a protocol processor to handle a protocol used by each line interface. The central processing device 105 informs each line interface of the processor ID with the port number of multi-protocol processing device added. Thereby, each line interface obtains the port number of the multi-protocol processing device having the protocol processor to process the protocol handled by itself, and the processor ID of protocol processor to handle the protocol. When multiple line interfaces to handle a same protocol are connected to the switch 103 and multiple multi-protocol processing devices having a protocol processor to handle the same protocol are connected, the processing load of the protocol processor mounted on the multi-protocol processing device can be distributed by informing a different line interface of a different port number and processor ID. This is a static distribution of processing load, but also available is a dynamic distribution of processing load explained below. Namely, when the processing load of a protocol processor has been heavy, the multi-protocol processing device 104 sends the processor ID of the protocol processor to the central processing device 105. Then, the central processing device 105 informs the processor ID of a protocol processor in another multi-protocol processing device to handle the same protocol as the current protocol processor, and the port number of that multi-protocol processing device, to the line interface handling the protocol. The line interface receiving that information switches the routing destination of data.

If a processor ID obtained by a line interface for an ATM by the above processing is #BB, the line interface adds the port number #AA and processor ID #BB to the ATM cell, thereby the ATM cell is sent by self-routing to the ATM protocol processor mounted on the multi-protocol processing device 104. The ATM protocol processor conducts the protocol processing such as signaling.

In FIG. 3, the operation of the multi-protocol processing device 104 is explained in detail below.

The switch interface 304 receives a packet shown in FIG. 6, deleting the port number from the packet, outputting the packet in the order of packet reception from the switch 103 to the processor selecting section 304. The processor selecting section 304 judges to which protocol processor of the protocol processors 305 to 307 the receive data should be forwarded, from the processor ID, then deleting the processor ID from the packet, outputting the data to any one of the protocol processors 305 to 307 designated by the processor ID. Each protocol processor analyzes the receive data and conducts the protocol processing.

For example, the processing performed by the ATM protocol processor is that of signaling. Also available is a processing that when the composition of the ATM network is changed by a failure etc., updates the forwarding table and sends it to each ATM line interface.

Also, the processing performed by Ethernet protocol processor includes a processing that when information of routing protocol is received, makes the routing table and sends the forwarding table to an Ethernet line interface.

Thus, the multi-protocol processing device 104 can assign data from the various types of line interfaces by self-routing to the multiple protocol processors 305 to 307, thereby processing the multiple protocols.

When data processed by protocol processor is output outside through the line interface, a packet is produced adding the number of a port connected to the line interface to the data processed by the protocol processor, and then the packet produced is output to the switch 103. Also, when data processed by protocol processor needs to be further processed by protocol processor of another multi-protocol processing device, a packet is produced adding the number of a port connected to the multi-protocol processing device and the processor ID of the protocol processor, and then the packet produced is output to the switch 103.

Meanwhile, in the above explanation, when the protocol processor to handle a same protocol is installed in a different multi-protocol processing device, a different processor ID is added. However, even when the protocol processor to handle a same protocol is installed to in a different multi-protocol processing device, the same processor ID may be added.

Also, multiple protocol processors to handle a same protocol may be installed in one multi-protocol processing device.

Advantages of the Invention

In this invention, by providing the multi-protocol processing device capable of processing multiple protocols at the trunk section of the switch, the need of providing a plurality of multi-protocol processing devices can be removed. Also, since one multi-protocol processing device has a plurality of protocol processors, the usage rate of port between the protocol processing device and switch can be increased. Furthermore, since the protocol processor is provided for each protocol, the processing load can be distributed.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A multi-protocol switching system, comprising:
   (1) a plurality of line interfaces each comprising:
      a) an input section for inputting data from a network,
      b) a forwarding table,
      c) a determination section for determining a destination of the input data based on the content of a header of the input data and the content of said forwarding table,
      d) a packet generating section for generating a packet,
         i) under a first condition when the destination determined by said determination section is a protocol processor, by adding to the input data a processor identifier of the protocol processor as the destination in a multi-protocol processing device and a port number, identifying a first port to which the multi-protocol processing device equipped with the protocol processor is connected, or
         ii) under a second condition when the destination determined by said determination section is a line interface, by adding to the input data a port number, identifying a second port to which the line interface as the destination is connected, and
      e) an output section for outputting the packet through the port to a switch; and
   (2) said switch connected to each of said plurality of line interfaces and to said multi-protocol processing device for forwarding the packet to one of the first and second ports which corresponds to the port number included in the packet; and
   (3) said multi-protocol processing device comprising:
      a) a switch interface for inputting/outputting the packet to/from said switch through the first port,
      b) a plurality of protocol processors which are provided corresponding to the kind of protocol and each of which has a processor identifier defined in the multi-protocol processing device, and
      c) a processor selecting section for outputting the packet input through said switch interface to one of the plurality of protocol processors having the processor identifier included in the packet;
   wherein a protocol handled by one of said plurality of line interfaces is different from a protocol handled by another of said plurality of line interfaces.

2. A multi-protocol switching system, according to claim 1, further comprising a plurality of multi-protocol processing devices and wherein:
   said processor identifier to a same protocol is in common use among said plurality of multi-protocol processing devices.

3. A multi-protocol switching system, according to claim 1, further comprising a plurality of multi-protocol processing devices and wherein:
   said forwarding table is sent from any one of said plurality of multi-protocol processing devices to each of said plurality of line interfaces.

4. A multi-protocol switching system, according to claim 1, further comprising a plurality of multi-protocol processing devices and wherein:
   said processor identifier is sent from any one of said plurality of multi-protocol processing devices to each of said plurality of line interfaces.

5. A multi-protocol switching system, according to claim 1, further comprising a plurality of multi-protocol processing devices and wherein:
   at least two of said plurality of multi-protocol processing devices each are provided with the protocol processor to handle a same protocol.

6. A multi-protocol switching system, according to claim 5, further comprising:
   means for distributing statically the protocol processor to handle a same protocol.

7. A multi-protocol switching system, according to claim 5, further comprising:
   means for changing dynamically the protocol processor to handle a same protocol.

8. A line interface, comprising:

an input section for inputting input data from a network;

a forwarding table;

a determination section for determining a destination of the input data based on the content of a header of the input data and the content of said forwarding table;

a packet generating section for generating a packet,
when the destination determined by said determination section is a protocol processor, by adding, to the input data, a processor identifier of the protocol processor as the destination in a multi-protocol processing device and a port number corresponding to a port to which the multi-protocol processing device equipped with the protocol processor is connected, or when the destination determined by said determination section is a line interface, by adding, to the input data, a port number to which the line interface as the destination is connected; and an output section for outputting the packet through the port to a switch.

9. A multi-protocol processing device, comprising:

a switch interface for inputting/outputting a packet to/from a switch through a port;

a plurality of protocol processors which are provided corresponding to different kinds of protocol and each of which has a processor identifier defined in the multi-protocol processing device; and a processor selecting section for outputting the packet input through said switch interface to a protocol processor having the processor identifier included in the packet;

wherein, said packet is received from on of a plurality of line interfaces, said packet including one of said processor identifiers of one of a plurality of protocol processors and a port identifier of said multi-protocol processing device.

* * * * *